United States Patent
Cheng et al.

(10) Patent No.: US 9,288,093 B2
(45) Date of Patent: Mar. 15, 2016

(54) SIGNAL MODULATION USING GUARD BAND DETERMINATION FOR IMPROVED FREQUENCY SPECTRUM EFFICIENCY

(71) Applicant: International Business Machines Corporation, Armonk, NY (US)

(72) Inventors: Xin Hao Cheng, Shanghai (CN); Yong Hua Lin, Beijing (CN); Jianbin Tang, Melbourne (AU); Jun Song Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/626,195

(22) Filed: Feb. 19, 2015

(65) Prior Publication Data

US 2015/0249561 A1  Sep. 3, 2015

(30) Foreign Application Priority Data

Feb. 28, 2014  (CN) .......................... 2014 1 0071892

(51) Int. Cl.
*H04K 1/10* (2006.01)
*H04L 27/26* (2006.01)
*H04W 72/04* (2009.01)

(52) U.S. Cl.
CPC ....... *H04L 27/2601* (2013.01); *H04W 72/0453* (2013.01)

(58) Field of Classification Search
CPC .................................................... H04L 1/0033

USPC .......................................................... 375/260
See application file for complete search history.

(56) References Cited

U.S. PATENT DOCUMENTS

| 8,274,880 | B2 | 9/2012 | Zhang et al. |
| 2004/0066312 | A1* | 4/2004 | Hoctor et al. ............. 340/870.07 |
| 2005/0174966 | A1* | 8/2005 | Lansford et al. ............... 370/329 |
| 2008/0240275 | A1 | 10/2008 | Cai |
| 2011/0211541 | A1 | 9/2011 | Yuk et al. |
| 2012/0087323 | A1* | 4/2012 | Feng et al. .................... 370/329 |

FOREIGN PATENT DOCUMENTS

EP          2525510 A2    11/2012

OTHER PUBLICATIONS

List of IBM Patents or Patent Applications Treated as Related; CN920130034US1, Date Filed: Feb. 19, 2015, pp. 1-2.
Xin Hao Cheng, et al., "Signal Modulation Using Guard Band Determination for Improved Frequency Spectrum Efficiency," U.S. Appl. No. 14/746,873, filed Jun. 23, 2015.

* cited by examiner

*Primary Examiner* — Lihong Yu
(74) *Attorney, Agent, or Firm* — Cantor Colburn LLP; Kelvan Razavi

(57) ABSTRACT

A method for signal modulation includes determining at least one guard band between at least two continuous available sub-bands among multiple available sub-bands that can be used by a communication entity and are discrete; and using the at least one guard band in signal modulation for the communication entity.

5 Claims, 5 Drawing Sheets

US 9,288,093 B2

SIGNAL MODULATION USING GUARD BAND DETERMINATION FOR IMPROVED FREQUENCY SPECTRUM EFFICIENCY

FOREIGN PRIORITY

This application claims priority to Chinese Patent Application No. 201410071892.4, filed Feb. 28, 2014, and all the benefits accruing therefrom under 35 U.S.C. §119, the contents of which in its entirety are herein incorporated by reference.

BACKGROUND

The present invention relates to the field of communication technology, and more specifically, to a method and apparatus for signal modulation.

In the prior art, some frequency bands are licensed to some communities or entities by particular authorities. These bands are called as licensed bands, which refer to those bands that can be used under licenses. Authorities that are responsible for issuing band licenses may comprise, for example, government departments or communication organizations and so on.

Generally, in Frequency Division Multiple Access (FDMA) based wireless communication systems (for example, the Personal Phone System (PHS) or OFDM systems such as Wimax, LET systems and so on), the licensed band may be divided into multiple sub-bands having the same bandwidth. Those multiple sub-bands may be utilized by several communication entities. Communication entities determine available sub-bands through scanning. The available sub-bands may be discrete, i.e., at least one unavailable sub-band may be found between multiple available sub-bands and separate said multiple available sub-bands from each other. A communication entity may be, for example, a base station, a mobile terminal, or a set of synchronized base stations and the like. Such communication entities are out of synchronization, or use different communication techniques.

In a system with discrete sub-bands in the prior art, each entity utilize a sub-band. A guard band is provided between two continuous sub-bands to prevent interference therebetween. In the prior art, each sub-band comprises two parts, i.e., an effective band and a guard band, wherein only the effective band may be used for signal transmission.

In a scheme in the prior art, several sub-bands are collected together and their effective bands are used for signal modulation.

SUMMARY

According to one embodiment of the present invention, there is provided a method for signal modulation, comprising: determining at least one guard band between at least two continuous available sub-bands among multiple available sub-bands that can be used by a communication entity and are discrete; and using the at least one guard band in signal modulation for the communication entity.

According to another embodiment of the present invention, there is provided an apparatus for signal modulation, comprising: a determination unit, configured to determine at least one guard band between at least two continuous available sub-bands among multiple available sub-bands that can be used by a communication entity and are discrete; and a modulation unit, configured to use the at least one guard band in signal modulation for the communication entity.

Compared with the prior art, because guard bands between adjacent sub-bands may be utilized sufficiently in the system having multiple discrete available sub-bands in the present invention, a higher frequency spectrum efficiency may be achieved.

Other features and advantages of this invention will become more apparent from the following description of exemplary embodiments of this invention with reference to accompanying drawings.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Disclosed herein are novel techniques that resolve at least one of the problems in the prior art. One aspect of the disclosed embodiments provides a new technical solution for signal modulation. Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
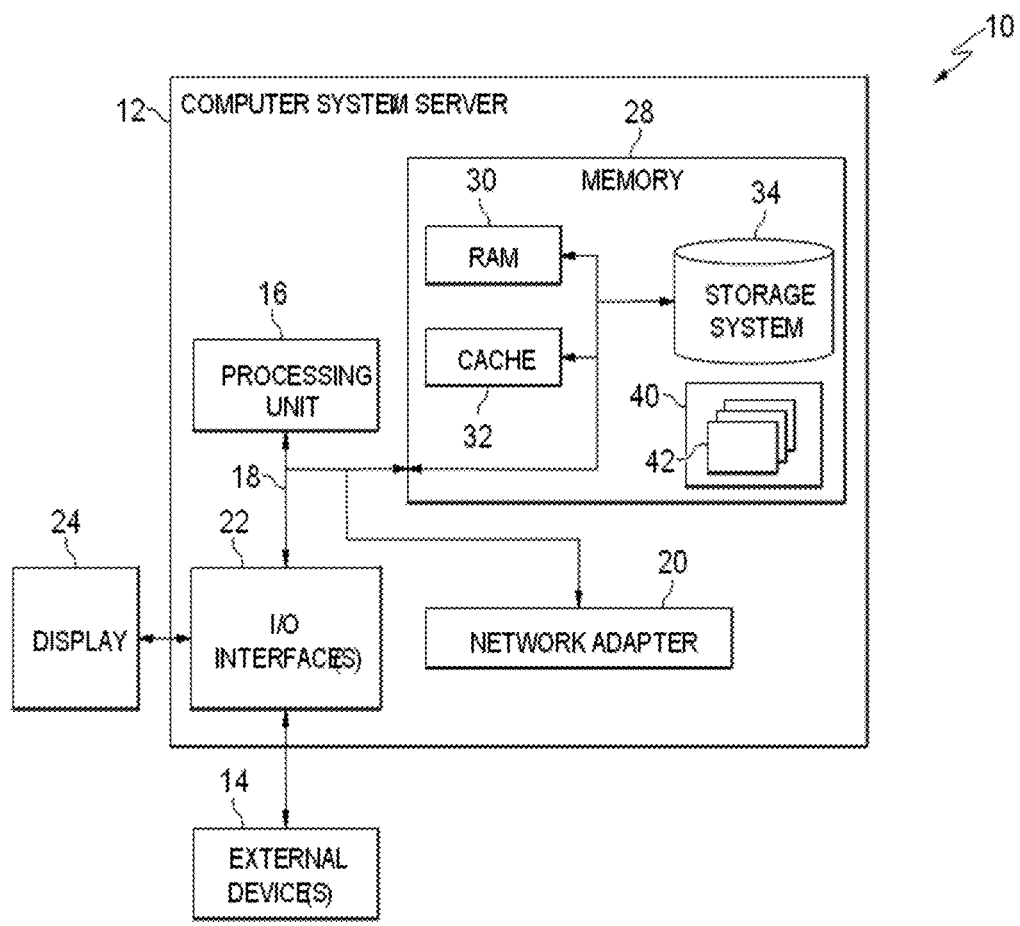
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Below, embodiments and examples of the present invention will be described with reference to the accompanying drawings, in which repetitive portions may be omitted.

Figure 2:
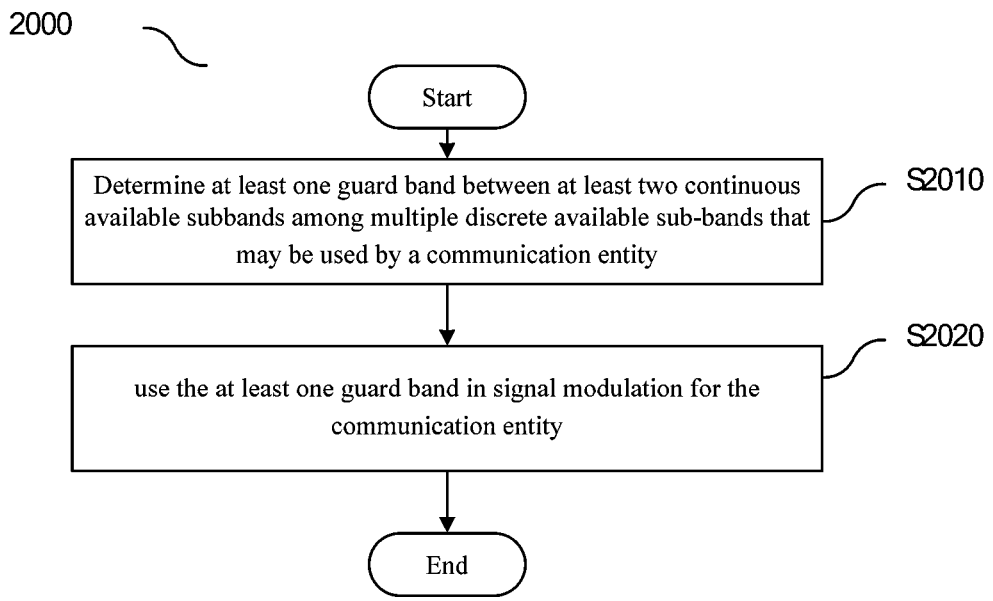
FIG. 2 shows a flowchart of a method for signal modulation according to an embodiment of the present invention.

FIG. 2 shows a method 2000 for signal modulation according to an embodiment of the present invention.

At block S2010, at least one guard band between at least two continuous available sub-bands among multiple available sub-bands that are available for a communication entity and are discrete is determined.

For example, the present invention may be applied in a system that may utilize a licensed band. The licensed band may be divided into multiple sub-bands. The multiple sub-bands may be utilized by multiple communication entities that are out of synchronization. One of the multiple communication entities may determine multiple discrete available sub-bands that may be utilized by the communication entity. Multiple discrete available sub-bands means there is at least one unavailable sub-band among the multiple available sub-bands by which the multiple available sub-bands are separated from each other. The communication entity may comprise, for example, a base station, a mobile phone, or any entity that may communicate through signal transmission.

At block S2020, the at least one guard band is used in signal modulation for the communication entity.

For example, the multiple sub-bands may have the same bandwidth. Two continuous sub-bands may comprise a guard band therebetween (in the middle thereof). Available sub-bands are those ones, which can be utilized by the communication entity, among the multiple sub-bands. In this invention, the available sub-bands are discrete. The available sub-bands comprise at least one set of continuous available sub-bands. Each set of continuous available sub-bands comprises at least two continuous available sub-bands. In this invention, a guard band between the at least two continuous available sub-bands is utilized for performing signal modulation.

In the prior art, a wideband system may determine multiple discrete available sub-bands through frequency scanning. However, it is not proposed in the prior art to utilize guard bands provided for sub-bands to perform signal modulation. In a wideband system, it is not determined which guard bands are available or which guard bands are unavailable. In this case, if two continuous sub-bands are occupied by the wideband system, the guard band between the two continuous sub-bands will be wasted. According to this invention, this guard band may be used for signal transmission. Thereby, frequency spectrum efficiency may be improved.

In an example, using the at least one guard band in signal modulation for the communication entity further comprises: reserving a reserved band in the size of a guard bandwidth at one of the two ends of the at least two continuous available sub-bands, the guard bandwidth being the bandwidth of the guard band; and using the remaining part except for the reversed band of the at least two continuous available sub-bands in signal modulation to generate a modulated signal.

For example, using the at least one guard band in signal modulation for the communication entity further comprises: performing frequency shift on the modulated signal in a direction towards said one of the two ends, so as to generate spare bands at the two ends of the at least two continuous available sub-bands, respectively, wherein the sum of the bandwidths of the spare bands generated at the two ends is equal to the guard bandwidth.

For example, the bandwidth $f_{sb}$ of each sub-band may be equal to the sum of an effective bandwidth $f_e$ and a guard bandwidth $f_g$. A reversed band with a bandwidth of $f_g$ may be reserved at one of the two ends of the at least two continuous available sub-bands. Then, the remaining part except for the reversed band of the at least two continuous available sub-bands may be used in signal modulation to generate a modulated signal. $f_g/2$ frequency shift is performed on the modulated signal towards said one of the two ends.

For example, the frequency shift may be performed from higher frequency to lower frequency or from lower frequency to higher frequency. In this invention, the frequency shift is performed in a direction from one to the other of the two ends.

The process can be simplified through the above method. Further, this method may further simplify bandwidth allocation. Particularly, in the case of directly using effective bands and available guard bands of sub-bands in modulation, it is necessary to determine which sub-bands have guard bands on their left that may not be used in modulation and which sub-bands have guard bands on their right that may not be used in modulation. Further, it is also necessary to divide a continuous guard band into two separate parts to modulate respectively. These operations may increase the complexity of the process. Further, these operations may reduce the flexibility and efficiency of band utilization. For example, if a service require a $f_g$ bandwidth, it may be difficult to allocate a $f_g$ bandwidth within a guard band in the prior art.

Further, according to this invention, signal modulation on a guard band may be converted into a signal mapping in frequency domain, which may significantly reduce the amount of process required for digital signal process.

Further, according to this invention, an overall spectrum transferring process is used as a substitute of individual signal spectrum shaping on various sub-bands, which may also reduce the amount of process significantly. Also, this may further simplify the structure of the communication system.

In another example, it is also possible to directly utilize the available sub-bands and their guard bands to perform signal modulation. For example, using the at least one guard band in signal modulation for the communication entity further comprises: reversing spare bands at the two ends of the at least two continuous available sub-bands, respectively, wherein the sum of the bandwidths of the spare bands at the two ends is equal to a guard bandwidth, the guard bandwidth being equal to the bandwidth of the guard band; and using the remaining part except for the spare bands of the least two continuous available sub-bands in signal modulation to generate a modulated signal.

In another example, determining at least one guard band between the at least two continuous available sub-bands that may be used by the communication entity comprises: obtaining information for identifying available sub-bands of the communication entity; and determining at least one guard band based on the information. For example, the information may comprise multiple bits, wherein each bit is used to represent whether a sub-band is available.

Further, the information for identifying available sub-bands of the communication entity may be obtained through frequency scanning.

In this example, only available sub-bands are identified in the information conveyed in the communication system, without additional information for indicating those available guard bands. This may reduce resources required by the system to broadcast the information (for example, the number of bits), thereby reducing control cost.

According to this invention, discrete available sub-bands within a licensed band may be utilized. For example, the available sub-bands may comprise individual available sub-bands that are discontinuous from each other or multiple sets of continuous available sub-bands. Thus, according to this invention, a higher flexibility in sub-band utilization may be provided for the communication system.

Figure 3:
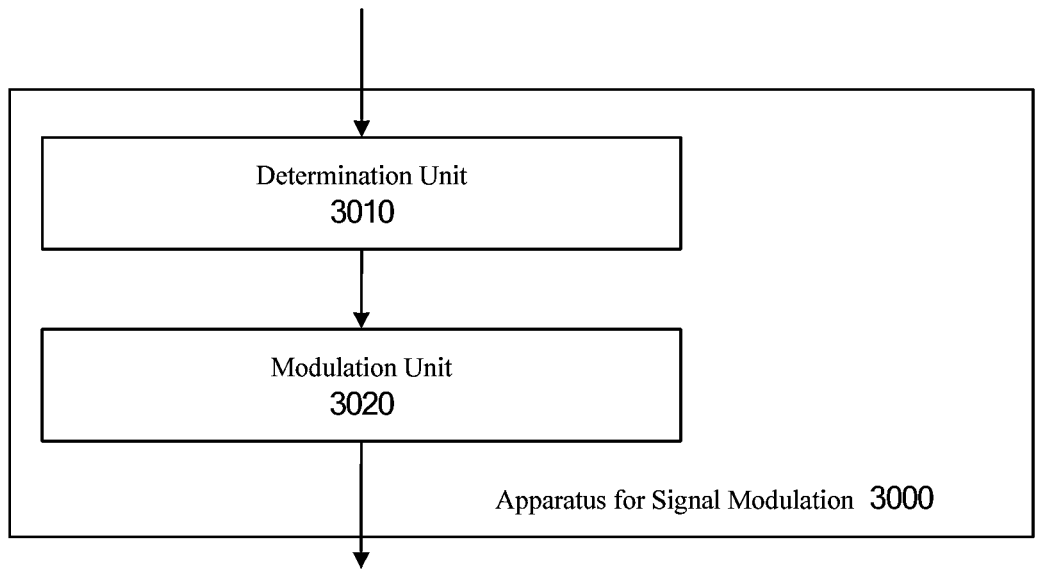
FIG. 3 shows a block diagram of an apparatus for signal modulation according to an embodiment of the present invention.

FIG. 3 shows an apparatus 3000 for signal modulation according to an embodiment of the present invention.

The apparatus 3000 for signal modulation comprises a determination unit 3010 and a modulation unit 3020.

The determination unit 3010 is configured to determine at least one guard band between at least two continuous available sub-bands among multiple discrete available sub-bands that may be used by a communication entity.

The modulation unit 3020 is configured to use the at least one guard band in signal modulation for the communication entity. Those skilled in the art may appreciate that any modulation techniques may be adopted to perform the modulation.

Those skilled in the art can appreciate that the determination unit 3010 and the modulation unit 3020 may be implemented in various manners. For example, a processor may be configured with instructions to implement the determination unit 3010 and the modulation unit 3020. For example, those instructions may be stored in ROM, and may be loaded from the ROM to a programmable device when the apparatus is started, to implement the determination unit 3010 and the modulation unit 3020. For example, the determination unit 3010 and the modulation unit 3020 may be solidified in a dedicated device. The determination unit 3010 and the modulation unit 3020 may be two separate units or may be combined together in one implementation.

In an example, the modulation unit 3020 is further configured to: reserve a reserved band in the size of a guard bandwidth at one of the two ends of the at least two continuous available sub-bands, the guard bandwidth being the bandwidth of the guard band; and use the remaining part except for the reversed band of the at least two continuous available sub-bands in signal modulation to generate a modulated signal.

For example, the modulation unit 3020 is further configured to perform frequency shift on the modulated signal in a direction towards said one of the two ends, so as to generate spare bands at the two ends of the at least two continuous available sub-bands, respectively, wherein the sum of the bandwidths of the spare bands generated at the two ends is equal to the guard bandwidth.

In another example, the modulation unit is further configured to reverse spare bands at the two ends of the at least two continuous available sub-bands, respectively, wherein the sum of the bandwidths of the spare bands at the two ends is equal to a guard bandwidth, the guard bandwidth being equal to the bandwidth of the guard band; use the remaining part except for the spare bands of the least two continuous available sub-bands in signal modulation to generate a modulated signal.

In another example, the determination unit is further configured to obtain information for identifying available sub-bands of the communication entity; and determine at least one guard band based on the information. For example, the information may comprise multiple bits corresponding to sub-bands within the licensed band, wherein each bit is used to represent whether a sub-band is available.

Further, the determination unit 3020 is further configured to: obtain the information for identifying available sub-bands of the communication entity through frequency scanning.

Figure 4:
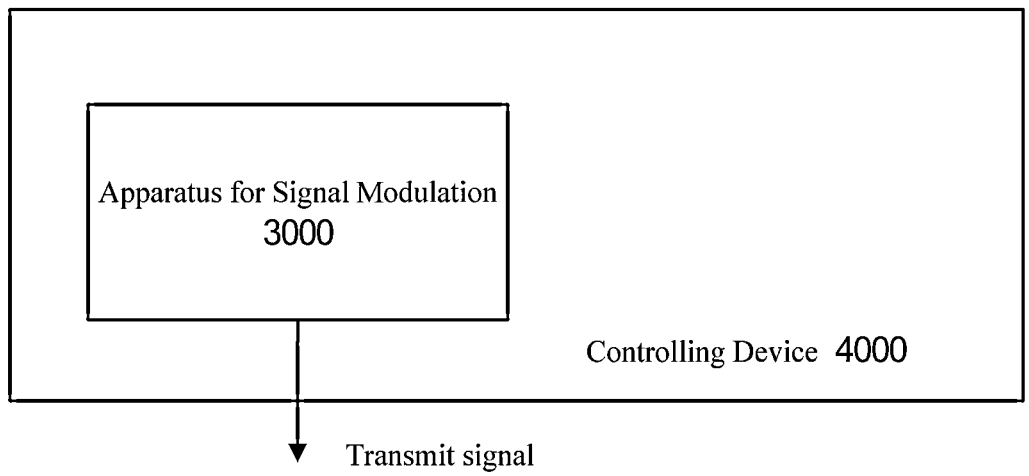
FIG. 4 shows a block diagram of a controlling device according to an embodiment of the present invention.

FIG. 4 shows a controlling device 4000 according to an embodiment of the present invention.

The controlling device 4000 may be, for example, a base station, a wireless router, and the like. The controlling device 4000 may comprise the apparatus 3000 for signal modulation according to the present invention.

The controlling device 4000 may be configured to perform frequency scanning to determine which sub-bands have been occupied and which sub-bands are available, and generate information for identifying available sub-bands.

The controlling device 4000 may determine at least one guard band that may be used in modulation based on the scanning result, for example. The controlling device 4000 may utilize the at least one guard band for signal modulation to generate a modulated signal for transmission. Those skilled in the art may appreciate that utilizing effective bands to perform signal modulation is well known in the art, which will not be described further herein. The controlling device 4000 may, for example, transmit the modulated signal to a terminal device connected thereto.

Figure 5:
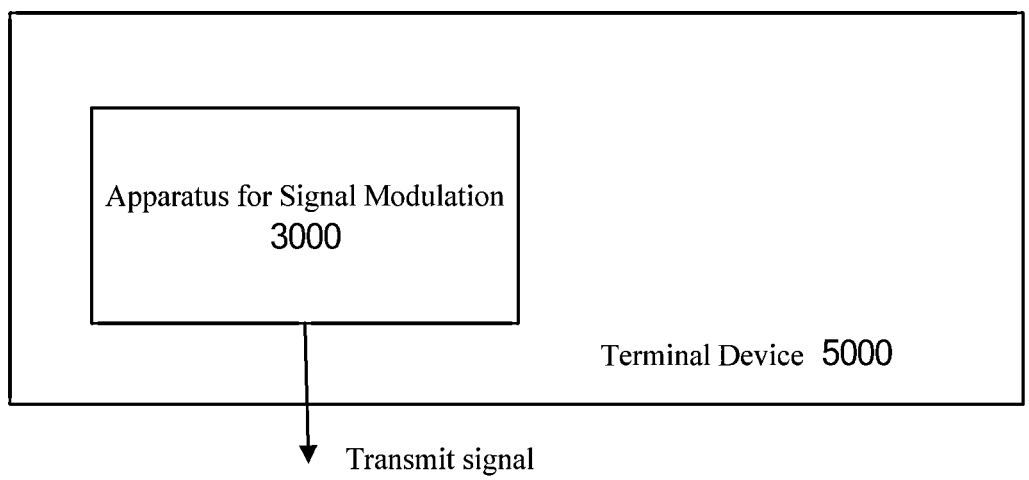
FIG. 5 shows a block diagram of a terminal device according to an embodiment of the present invention.

FIG. 5 shows a terminal device 5000 according to an embodiment of the present invention.

The terminal device 5000 may be, for example, a mobile phone, a notebook computer, and the like. The terminal device 5000 may comprises, for example, the apparatus 3000 for signal modulation according to the present invention.

The apparatus 3000 in the terminal device 5000 may, for example, receive information from a controlling device to determine guard bands that may be used for signal modulation, and then use the guard bands to generate a modulated signal for transmission.

In some systems (e.g., Ad Hoc systems), the apparatus 3000 in the terminal device 5000 may determine guard bands that may be used for signal modulation by itself.

Figure 6:
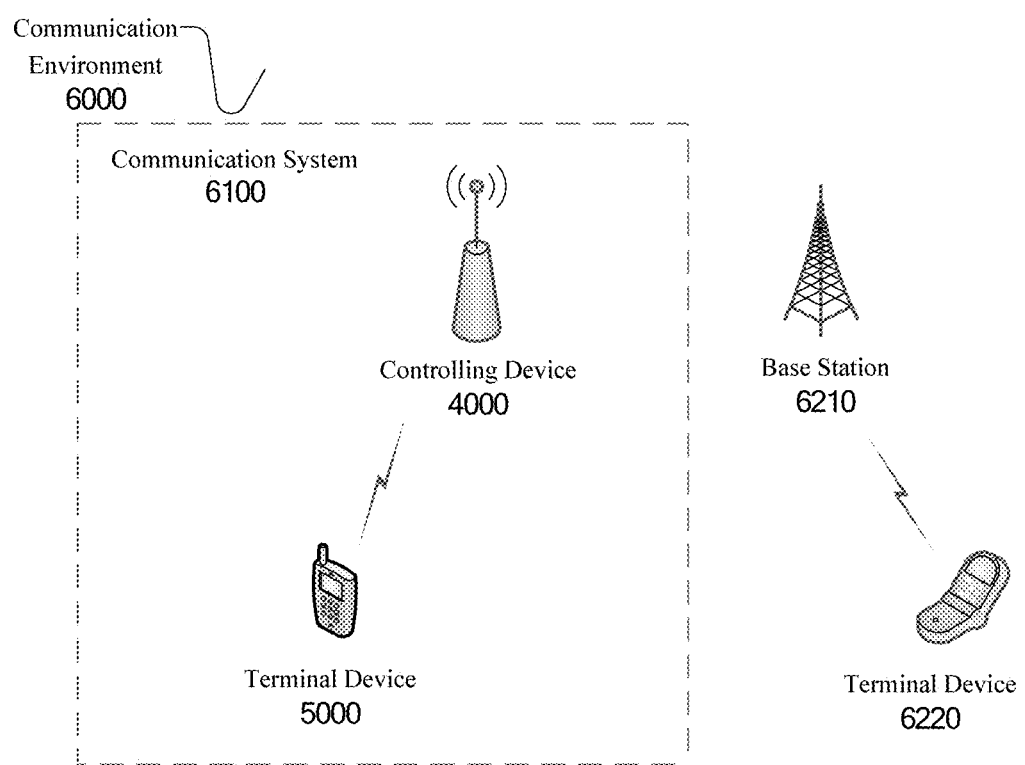
FIG. 6 shows a schematic diagram of a communication environment in which the present invention may be implemented.

FIG. 6 shows an exemplary communication environment 6000 in which the present invention may be implemented. There is a communication system 6100 according to the present invention and other communication devices, such as a base station 6210, other terminal devices 6220 and so on, in the communication environment 6000.

The communication system 6100 comprises a controlling device 4000 and a terminal device 5000 according to the present invention. For example, the controlling device 4000 and/or the terminal device 5000 are not synchronized with the based station 6210 and/or the terminal device 6220. Thus, guard bands are needed between signals for the controlling device 4000 and/or the terminal device 5000 and signals for the based station 6210 and/or the terminal device 6220, so as to prevent mutual interference.

Some sub-bands have been occupied by the based station 6210 and/or the terminal device 6220. A determination unit of the controlling device 4000 may determine sub-bands that are available through scanning a licensed band, and generate information for identifying those available sub-bands. The available sub-bands are, for example, multiple discrete available sub-bands. The controlling device 4000 sends the information to the terminal device 5000. Both the determination unit of the controlling device 4000 and the determination unit of the terminal device 5000 may determine guard bands that may be used for signal modulation based on the information. The controlling device 4000 and the terminal device 5000 may utilize the guard bands to communication.

Figure 7:
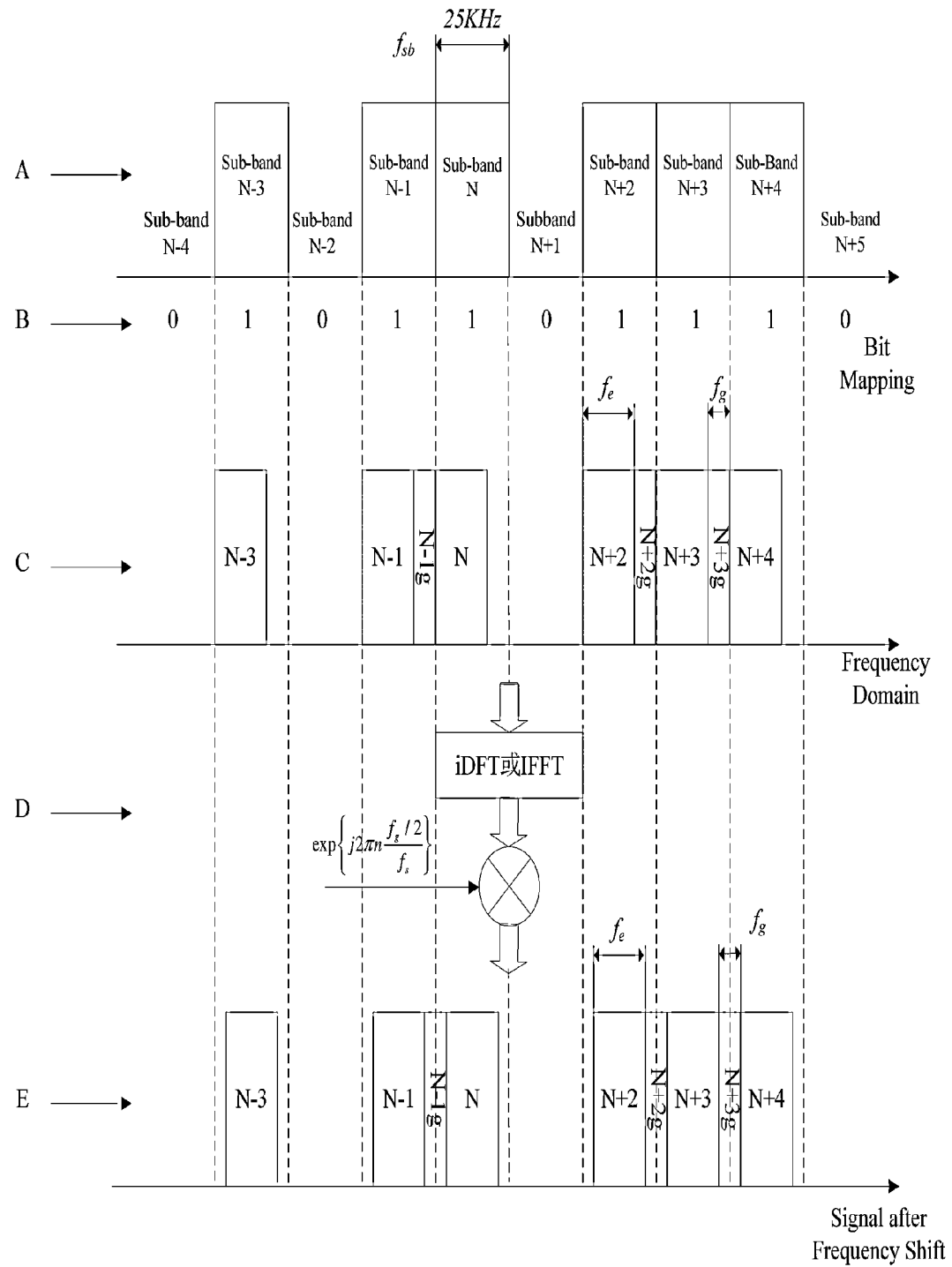
FIG. 7 shows an example of a specific application according to this invention.

FIG. 7 shows an example of a specific application according to this invention.

The example shown in FIG. 7 may be realized with an apparatus or device according to the present invention.

As shown in FIG. 7, row "A" indicates sub-bands N−4, N−3, . . . , N+5. Each sub-band has a bandwidth of $f_{sb}$=25 KHz. Sub-bands N−3, N−1, N, N+2, N+3, N+4 are available sub-bands. FIG. 7 shows two set of continuous available sub-bands (N−1, N) and (N+2, N+3, N+4).

For example, available sub-bands N−3, N−1, N, N+2, N+3, N+4 may be determined by an communication entity through frequency scanning. The available sub-bands N−3, (N−1, N), (N+2, N+3, N+4) are discrete.

Row "B" indicates information for identifying sub-bands that are available for the communication entity. The information comprises a set of bits, 0101101110, wherein "0" represents that a sub-band is unavailable, and "1" represents that a sub-band is available.

Row "C" represents effective bands ($f_e$) and guard bands ($f_g$) in the available sub-band. In the example shown in FIG. 7, reserved bands having a reserved bandwidth of $f_g$ are reserved at one end (the right end, however it may be the left end in other examples) of a set of continuous sub-bands (N−1, N) and one end of a set of continuous sub-bands (N+2, N+3, N=4), respectively. In each sub-band, signal modulation is performed from the other end (the left end, however it may be the right end in other examples). At least one of the guard bands N−1g, N+2g, N+3g is used for signal modulation to generate an intermediate modulated signal.

Row "D" represents performing inverse discrete Fourier transform (iDFT) or inverse fast Fourier transform (IFFT) on the intermediate modulated signal to perform $f_g/2$ frequency shift on the intermediate signal from a starting position towards an ending position. For example, an operation of:

$$\exp\left\{j2\pi n \frac{f_g/2}{f_s}\right\}$$

may be performed on the modulated signal to realize the frequency shift.

Row "E" represents a final modulated signal. As shown in FIG. 7, discrete sub-bands N−3, N−1, N, N+2, N+3, N+4 and guard bands N−1g, N+2g, N+3g are used for the final modulated signal.

The apparatus or device according to the present invention may transmit the modulated signal.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for signal modulation, comprising:
a determination unit, configured to determine at least one guard band between at least two continuous available sub-bands among multiple available sub-bands that can be used by a communication entity and are discrete; and
a modulation unit, configured to:
use the at least one guard band in signal modulation for the communication entity;
reserve a reserved band in the size of a guard bandwidth at one of the two ends of the at least two continuous available sub-bands, the guard bandwidth being the bandwidth of the guard band;
use a remaining part except for the reversed band of the at least two continuous available sub-bands in the signal modulation to generate a modulated signal; and
perform frequency shift on the modulated signal in a direction towards said one of the two ends, so as to generate spare bands at the two ends of the at least two continuous available sub-bands, respectively, wherein a sum of the bandwidths of the spare bands at the two ends is equal to the guard bandwidth.

2. The apparatus according to claim 1, wherein the modulation unit is further configured to:
reverse spare bands at the two ends of the at least two continuous available sub-bands, respectively, wherein the sum of the bandwidths of the spare bands at the two ends is equal to a guard bandwidth, the guard bandwidth being equal to the bandwidth of the guard band; and
use the remaining part except for the spare bands of the least two continuous available sub-bands in the signal modulation to generate a modulated signal.

3. The apparatus according to claim 1, wherein the determination unit is further configured to obtain information for identifying available sub-bands of the communication entity; and determine the at least one guard band based on the information.

4. The apparatus according to claim 3, wherein the information comprises multiple bits corresponding to sub-bands within a licensed band, wherein each bit is used to represent whether a sub-band is available.

5. The apparatus according to claim 3, wherein the determination unit is further configured to: obtain the information for identifying available sub-bands of the communication entity through frequency scanning.

\* \* \* \* \*